US006775660B2

(12) United States Patent
Lin et al.

(10) Patent No.: US 6,775,660 B2
(45) Date of Patent: Aug. 10, 2004

(54) USER-ORIENTED METHOD AND SYSTEM FOR DATABASE QUERY

(75) Inventors: Hong Lin, Beijing (CN); Song Song, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 09/788,892

(22) Filed: Feb. 20, 2001

(65) Prior Publication Data

US 2001/0021929 A1 Sep. 13, 2001

(30) Foreign Application Priority Data

Feb. 21, 2000 (CN) ........................................ 00102351 A

(51) Int. Cl.[7] ................................................ G06F 17/30
(52) U.S. Cl. .............................. 707/3; 707/2; 707/10; 709/219
(58) Field of Search ............................. 707/1, 3, 10, 2; 709/219

(56) References Cited

U.S. PATENT DOCUMENTS

| | | | | |
|---|---|---|---|---|
| 5,842,009 A | * | 11/1998 | Borovoy et al. ............... 707/1 |
| 5,845,282 A | * | 12/1998 | Alley et al. .................... 707/10 |
| 5,870,741 A | * | 2/1999 | Kawabe et al. ................ 707/5 |
| 6,065,001 A | * | 5/2000 | Ohkubo et al. ................ 707/3 |
| 6,105,022 A | * | 8/2000 | Takahashi et al. ............. 707/3 |
| 6,334,126 B1 | * | 12/2001 | Nagatomo et al. ............. 707/4 |
| 6,366,915 B1 | * | 4/2002 | Rubert et al. .................. 707/10 |
| 6,421,716 B1 | * | 7/2002 | Eldridge et al. ............ 709/219 |
| 2003/0011805 A1 | * | 1/2003 | Yacoub ...................... 358/1.15 |
| 2003/0177137 A1 | * | 9/2003 | MacLeod et al. ........... 707/102 |

* cited by examiner

Primary Examiner—Shahid Alam
Assistant Examiner—Chongshan Chen
(74) Attorney, Agent, or Firm—Rafael Perez-Pineiro; Anne V. Dougherty

(57) ABSTRACT

A user-oriented database query system, comprising user management means; device management means; control means for identifying a user, receiving a database query request and appended parameters, converting the database query request into a database query command; query agent means for submitting database query command at suitable time and receiving the query results; query recording means for storing the database query request, the appended parameters, the query command, the query time and the query results; wherein the control means further determines a receiving device, converts the query results into a form acceptable by the receiving device and sends the query results thereto, and terminates the query after the acknowledgment of the success of sending.

35 Claims, 3 Drawing Sheets

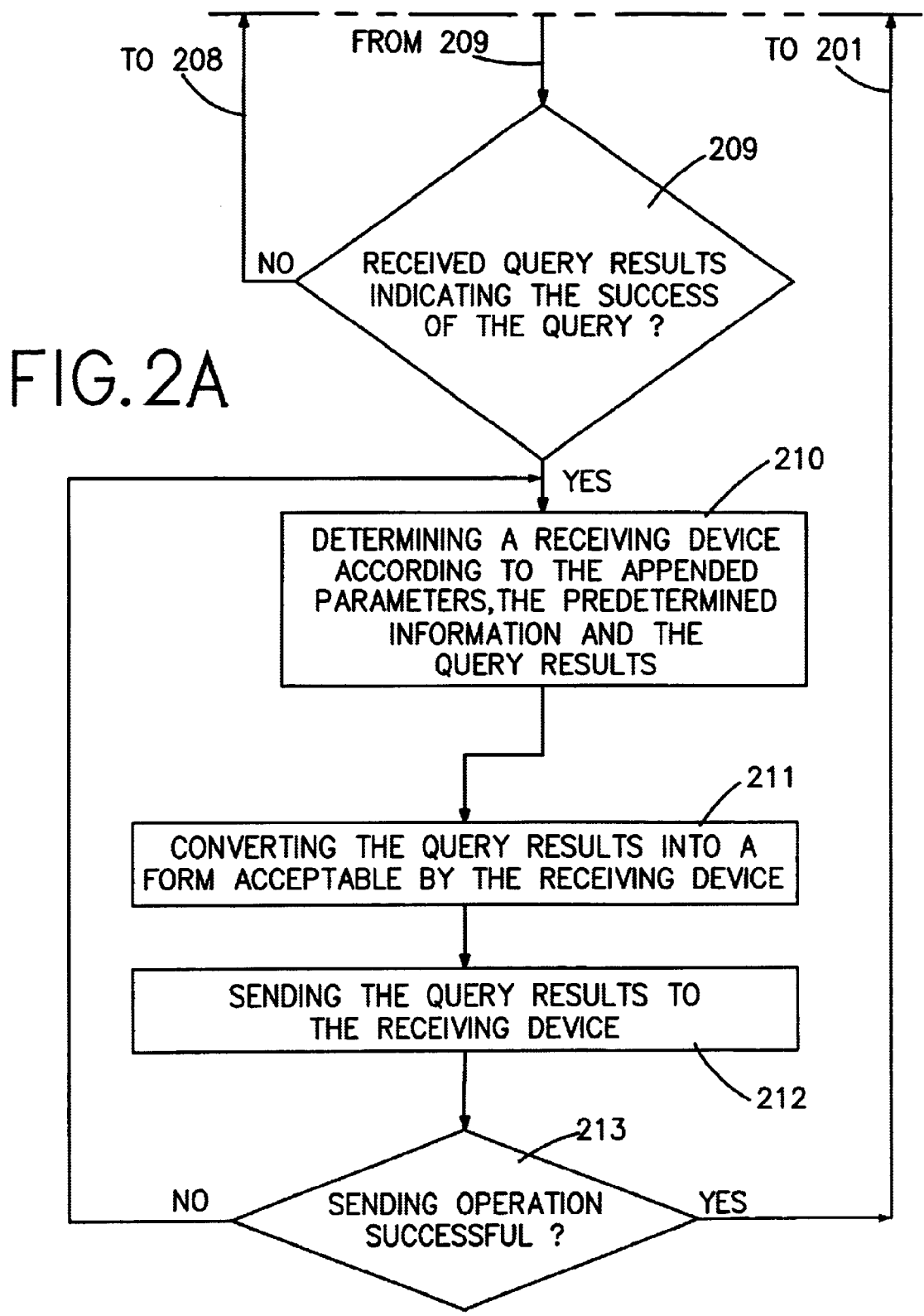

USER-ORIENTED METHOD AND SYSTEM FOR DATABASE QUERY

FIELD OF THE INVENTION

The invention relates to a method and system for database query by using a querying device, and particularly to a user-oriented method and system for database query.

BACKGROUND OF THE INVENTION

Conventional database query systems employ a client/server architecture. In the process of submitting a query request and obtaining the query results, there is kept a continuous connection between the client computers and servers. For the mobile users, as the battery capacities are limited and the users are moving around all the time, it is not feasible to keep a continuous connection between the querying devices and servers during the query.

In order to employ the querying devices for database query, a client/agent/server architecture has been developed for implementing a system for database query by using a querying device. In such an architecture, an agent is added in between the mobile client and the server. The agent converts a query request submitted by a client into a corresponding database query command; hands it over to the server; converts it into a format acceptable by the client after the query results returned by the server are received; and, finally sends the results back to the client.

Although the database query system of the existing client/agent/server architecture does not require keeping a continuous connection between the querying devices and the agent computers, it requires that the query result receiving device and the querying device submitting the request are one device. Obviously this requirement restricts the types of devices which may be used as querying devices of the client computers, because it requires that the querying devices should have certain data input and data output capabilities at the same time. However, the devices which have certain data input and data output capabilities at the same time are usually rather expensive and not so popular among most users, so they are not suitable for being used as querying devices. This situation restricts, to a certain extent, the applications of existing client/agent/server architecture database query system for most of the users.

Up to now, various kinds of computing devices have been developed. Moreover, with the rapid development of science and technology, there will appear more sophisticated computing devices. Those computing devices will have various computing capabilities and communication capabilities. For example, CrossPad has only data input capability but no data display capability. One-way pagers can only receive data but cannot transmit data. Many PDAs (Personal Digital Assistants) have Infra-Red interfaces, which are only suitable for short distance communications. The above computing devices cannot be used as querying devices in the database query systems of the existing client/agent/server architecture. So it is a big problem in the prior technology to provide various kinds of the existing computing devices which can be used for database query.

The other problem in the prior technology is that the users cannot obtain any query results due to querying device faults, device loss or other reasons, after the querying devices have submitted query requests. In some special cases, when the information about natural disasters such as flood, earthquake, typhoon etc. is urgently needed, the loss of query results may mean great loss of lives and property. That is, in some cases the database query systems of the existing client/agent/server architecture are not reliable.

It is therefore an object of the invention to solve the above problems in the prior technology and to provide a user-oriented database query method and system so that the users can employ various kinds of the existing computing devices as querying devices for database query and can obtain the query results.

SUMMARY OF THE INVENTION

The foregoing and other objects are realized by the present invention which provides a user-oriented database query method and system for performing the method comprising the following steps, which are executed by the agent computer, of:

(1) establishing a connection with a querying device, identifying a user and a querying device;

(2) receiving a query request and appended parameters from the identified querying device;

(3) converting the query request into a database query command based on the querying device type and the queried database type;

(4) determining a query time based on the appended parameters, the network status and the predetermined information;

(5) submitting the database query command after the expiration of the query time and then receiving query results;

(6) determining a receiving device based on the appended parameters, the predetermined information and the query results;

(7) converting the query results into a form acceptable by said receiving device; and (8) sending query results to said receiving device and terminating the query after the acknowledgment of success of sending.

The invention further provides a user-oriented database query system comprising user management means for managing a plurality of users registered in said database query system and the predetermined information of individual users; device management means for managing a plurality of querying devices and a plurality of receiving devices supported by said database query system; control means for identifying a user by using said user management means, for receiving a database query request and the appended parameters, sent by the user using a querying device converting said database query request into a database query command based on the querying device type and the queried database type, and for determining a query time based on the appended parameters, the network status and predetermined information; query agent means for submitting database query command after the expiration of the query time and receiving the query results; and, query recording means for storing the database query request and the appended parameters received by said control means, the database query command converted by said control means and the determined query time, and for storing the query results received by said query agent means; wherein said control means further determines a receiving device based on the appended parameters, the predetermined information and the query results, converts the query results into a form acceptable by said receiving device, then sends the query results to said receiving device and terminates the query after the acknowledgment of success of sending.

The method and system of the invention can use various kinds of computing devices as querying devices and receiving devices, as large as desktop computers and as small as mobile telephones or one-way/two-way pagers. With these devices, the users can reliably make various database queries and best obtain the query results.

The inventive method can save the connection fee and conveniently provide call-back functionality. The users can remove the connection after they have submitted a database query request. The inventive system can call back the users automatically and continuously after it has received the query results until the users obtain the query results. If a user's receiving device is out of use, the system can automatically select another of the user's available receiving devices to receive the query results.

The inventive method and system can conveniently exercise a periodic query and a timed query. The users need only submit the database query request once and the system will automatically either periodically or immediately make queries many times, and continuously send the updated query results back to the users.

BRIEF DESCRIPTION OF THE DRAWINGS

The detailed description of the preferred embodiments of the invention with reference to the accompanying figures will make the above features and advantages of the invention more apparent, wherein.

DETAILED DESCRIPTION OF THE INVENTION

Figure 1:
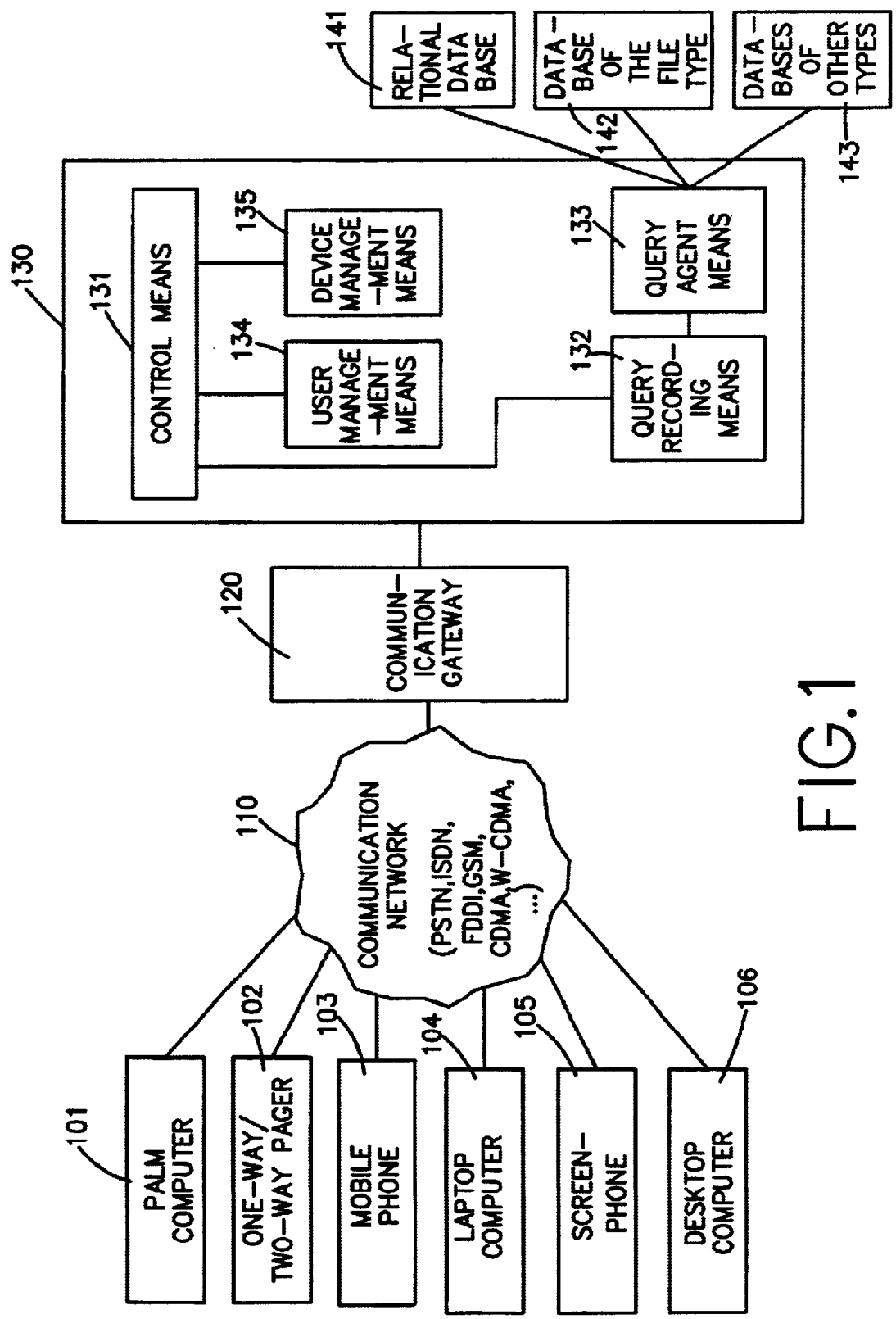
FIG. 1 is a schematic diagram of a user-oriented database query system according to the invention.

In FIG. 1, labels 101 through 106 represent various kinds of computing devices which can each be used as a querying device and a receiving device of the invention, for example including a palm computer 101, an one-way/two-way pager 102, a mobile telephone 103, a laptop computer 104, a screen phone 105, a desktop computer 106 and so on. When used as querying devices, these devices have certain input capabilities and communication capabilities. In the implementation, they may be a combination of the means with input capabilities and the means with communication capabilities. When used as receiving devices, they have certain output capabilities and communication capabilities. In the implementation, they may be a combination of the means with output capabilities and the means with communication capabilities.

Reference number 110 represents a communication network, such as PSTN (Public Switched Telephone Network), ISDN (Integrated Services Digital Network), FDDI (Fiber Distributed Data Interface), GSM (Group-Special Mobile), CDMA (Code Division Multiple Access) and W-CDMA (Wide band Code Division Multiple Access) networks, and so on. Label 120 represents a communication gateway, which is responsible for the data communication between various querying devices or receiving devices 101 through 106 and an agent computer 130. Label 130 represents an agent computer employed in the invention, including control means 131, query recording means 132, query agent means 133, user management means 134 and device management means 135 and so on.

Reference numerals 141 through 143 represent various databases in the prior technology. For example, label 141 represents a relational database, label 142 represents a database of the file type and so on. Label 143 represents any other type of available databases in the prior technology.

User management means 134 is used for managing a plurality of users registered in the inventive database query system and the predetermined information of individual users. The predetermined information comprises the information submitted by the users during their registration and the information submitted or updated after the user registration. The predetermined information reflects at least the user priorities, available querying devices and receiving devices and the requirements of the users to the communication fees and transmission time.

There are various aspects of user management, including authentication of the user identity, setting of the user priority, setting of the service type, setting of the priority of returned query results etc.

For example, in user management means 134 the following format of user registration table can be stored.

| User Registration Table |
| --- |
| user name |
| password |
| user priority |
| service type |
| priority type of returned results |

In the user registration table, the user name and password need not to be further described. User priority denotes a level of priority to be accorded to the user compared with other users under the same condition. Service type denotes how many types of services the user can use and which databases the user can access. Priority type of returned results is designated by the user and is used to denote whether the results are to be returned by time priority or by fee priority. The above mentioned examples of information is representative and should not be construed as posing any restrictions on the user management means 134.

Device management means 135 is used for managing a plurality of querying devices and a plurality of receiving devices supported by the inventive database query system. There are also various aspects of device management, such as identification of the devices, setting of the communication protocols, setting of the priorities etc. For example, in device management means 135 the following format device registration table can be stored:

| Device Registration Table |
| --- |
| user name |
| device type |
| device model |
| communication number |
| device attribute |
| priority |
| device operation status |
| restrictions on device operation |

In the device registration table, device type denotes various kinds of computing devices supported by the inventive database query system, such that the users can use these computing devices as querying devices or receiving devices. Those computing devices comprise, for example, mobile phones, one-way/two-way pagers, personal digital assistants, palm computers, laptop computers, screen phones, desktop computers, and similar kinds of computing devices. Device model denotes a particular model number of certain devices. Taking a mobile phone as an example, the device model may denote various models of the mobile phones manufactured by one factory. The communication number denotes the dialing number of the computing device, such as the dialing number of a mobile phone, the calling number of a pager etc. The Device attribute denotes the technical specifications of a computing device, such as the communication capability, the input and output capabilities, display capability, storage capacity, etc. Priority denotes the priority in the sequence of priority by time, priority in the sequence of priority by fee etc. Device operation status denotes the status of the computing device being switched on or off. Restrictions on device operation denote particular conditions for the operation of the computing devices, for example some mobile phones can only operate during the working time, etc.

Control means 131 is used for identifying a user by using the user management means 134, receiving a database query request and the appended parameters sent by the user using a querying device, converting the database query request into a database query command based on the querying device type and the queried database type, and determining a query time based on the appended parameters, the network status, and the predetermined information. Herein the appended parameters include information such as query attributes, query priorities, and designated receiving devices. Query attributes denote at least a one-time query, a periodic query, or a timed query. The predetermined information was described above.

Query agent means 133 is used for submitting database query commands to related databases after the expiration of the query time, and for receiving query results therefrom.

Query recording means 132 is used for storing the database query request and the appended parameters received by control means 131, the database query command converted by control means 131 and the determined query time, and for storing the query results received by query agent means 133.

Furthermore, control means 131 determines a receiving device based on the appended parameters, the predetermined information, and the query results; converts the query results into a form acceptable by the receiving device; sends the query results to the receiving device; and, terminates the query after the acknowledgment of the success of sending.

It has to be emphasized here that the receiving device determined by control means 131 may or may not be the receiving device designated by the user in the query request. If the query results can not be successfully received by the receiving device, however, control means 131 can select one from a plurality of devices registered by the user in the system.

There are various ways of implementing the functionality of control means 131, query recording means 132 and query agent means 133. There are various ways of data communications between them. Here is one example. For example, in query recording means 132 the following format of query record table can be stored:

| Query Record Table |
|---|
| user name |
| query code |
| query condition |
| user priority |

| -continued |
|---|
| Query Record Table |
| query priority |
| query result type |
| type of query receiving device |
| sequence of query receiving devices |
| query attribute |
| starting date |
| ending date |
| query period |
| query time |
| query results |
| query sequence number |
| query submitting device type |
| sequence of designated receiving devices |

The data submitted by the user, the data generated by control means 131, and the data received by query agent means 133 can be recorded in every record of the query record table. The data submitted by the user include: user name, query code, query condition, query priority, query attribute, starting date and ending date (if the query attribute is designated as a timed query), query period (if the query attribute is designated as a periodic query) etc. In addition, the user can designate the type and order of the receiving device. Query code and query condition can determine the queried database and the query condition. The user determines the query priority according to the degree of emergency of the needed query results.

The query attributes denote whether the query is a one-time query, a periodic query, a timed query, or a query activated under other particular conditions. For the periodic queries, the query agent means submits database query request and receives the query results periodically at a certain period. For the timed queries, the query agent means automatically submits database query request and receives the query results in the designated legal period of query time.

If the user has designated a device sequence to be used for returning the query results, control means 131 determines the receiving device according to the designated device sequence. Only when all of the designated devices are not able to receive the query results successfully can a device be selected according to the above user registration table and device registration table.

Control means 131 can assign a query sequence number to each record while it stores the query command into the query record table. The Query submitting device type can be determined by control means 131 according to the data transferred from communication gateway 120. The user priority can be obtained from user management means 134.

Control means 131 judges the type of query results and the data quantity based on the query code. The type of the query results denotes for example small message, large text, image, audio, video, etc. Control means 131 determines a query time based on the information such as user priority, query priority, query attribute, query results, and the current system operation status.

Query agent means 133 stores the received query results into the query record table. The query results are read out from the query record table by control means 131 and sent back to the user.

The real type of the query results can be used to overlay the judged values of the type of the recorded query results in the query record table.

If the user has not designated any receiving device when submitting a query request (usually it is not necessary to designate a receiving device), control means 131 determines a type of the receiving device according to the querying device type and attributes of the receiving device, then a sequence of query receiving devices is given according to the priority type in the user registration table and the priority and device operation status and restrictions on device operation in the device registration table.

It is to be noted here that the above three given tables are not the only ways for storing the data and therefore they do not pose any restrictions on the invention.

In implementing the inventive user-oriented database query system, one example is used where a mobile phone supporting WAP (Wireless Application Protocol) is used as a computing device for submitting database query requests and returning the query results to the mobile phone in the form of short messages. Of course, as mentioned above, the computing device can be any computing device employing the prior technology or the technology to be presented on the market.

Figure 2:
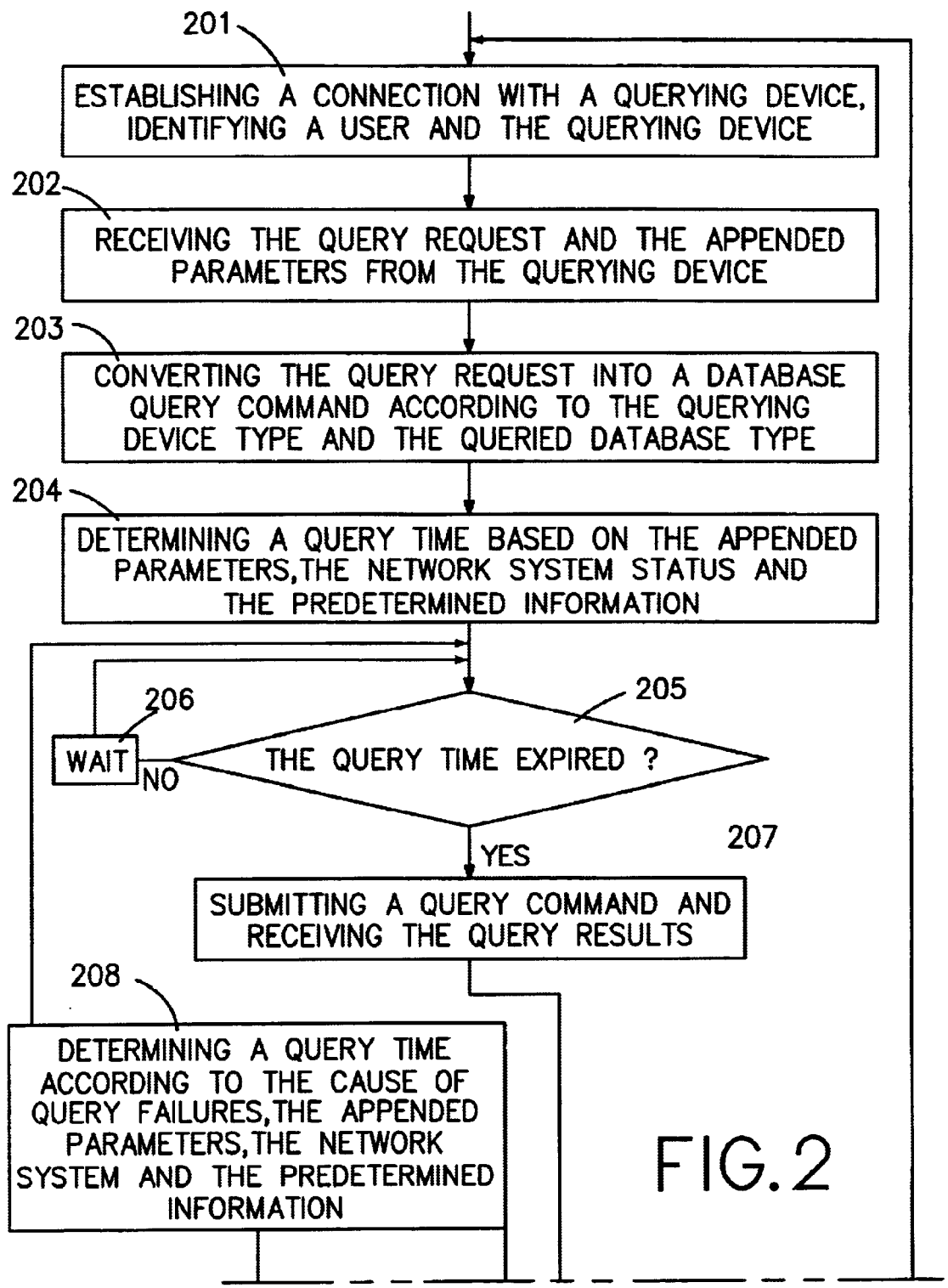
FIG. 2 is a flow-chart of a user-oriented database query method according to the invention.

Below a user-oriented database query method of the invention will be described with reference to FIG. 2, which can be used in the agent computer 130 shown in FIG. 1. FIG. 2 is a flow-chart of a user-oriented database query method according to the invention.

At first in step 201 communication gateway 120 utilizes communication network 110 to establish a connection with a querying device (e.g., one of the querying devices 101 through 106), and identifies the user and the querying device. Thereby, the user identity is authenticated. If the user is legal, the following steps are executed.

In step 202 a database query request and the appended parameters submitted by the user are received from a querying device through communication gateway 120 and communication network 110. Herein the appended parameters include information such as query attributes, query priorities and designated receiving devices. Query attributes denote at least a one-time query, a periodic query, or a timed query.

In step 203 the query request is converted into a corresponding database query command according to the querying device type and the queried database type.

It should be noted that various database query commands use various formats, therefore, the agent computer 130 is able to determine which database the user wants to access based on the query request, and then converts the query request into a format of query command used by this database.

Optionally, the query command generated in step 203 can be stored in agent computer 130, and a time table and a priority can be set according to at least one of user priority, query priority, query attribute, query result type, and the operation status of the related database. The time table and priority have been described above. For example, in step 204 a query time is determined based on the appended parameters, the network system status and the predetermined information.

Herein the predetermined information are the information submitted by the users during their registration and the information submitted or updated after the user registration. The predetermined information reflect at least the user priorities, available querying devices and receiving devices, and the requirements of the users to the communication fees and transmission time.

In step 205 it is judged whether the query time has expired or not. If the judgement result is negative, then the process waits in step 206. Otherwise the process proceeds to step 207.

In step 207 a query command is submitted to the related database and the query results are received.

In step 209 it is judged whether the received query results indicate the success of the query. If the judgement result is negative, then the process proceeds to step 208, otherwise it proceeds to step 210.

In step 208 a query time is determined according to the cause of query failure, the appended parameters, the network system status, and the predetermined information. Then the process branches to step 205.

In step 210 a receiving device is determined according to the appended parameters, the predetermined information of the query results. Herein the determined receiving device can be the same device as the querying device or a different device. Step 210 may also be designed as a step of selecting a suitable receiving device based on the information quantity and information characteristics of the query results. The information characteristics mean that the query results may be numerals, texts, graphics, images, audio or video data.

Thereafter, in step 211 the query results are converted into a form acceptable to the receiving device. In step 212 the converted query results are sent to the receiving device through communication gateway 120 and communication network 110. If there is no connection with the receiving device, step 212 further includes the step of establishing a connection with the receiving device. In step 213 it is judged whether the sending operation is successful or not.

If the sending operation is successful, the process returns to step 201 to wait for the next query. Otherwise the process returns to step 210 to determine another available receiving device.

The loop consisting of steps 205, 207, 209 and 208 ensures that the query should be successful. The loop consisting of steps 210 through 213 is able to ensure the largest possibility that the users can obtain the query results.

If the query attribute contained in the appended parameters indicates that it is a periodic query, the above method can be designed as having set a certain period of time and automatically executing the steps 204 through 213 periodically, and storing the query results in agent computer 130 so that the query results can be sent to the receiving device later.

If the query attribute contained in the appended parameters indicates that this is a timed query, the above method can be designed as automatically executing the steps 204 through 213 in the legal time period for query and storing the query results in agent computer 130 so that the query results can be sent to the receiving device later.

Herein the querying devices and receiving devices can be any types of computing devices. As a querying device, the computing device has at least input capabilities and communication capabilities. For example, there may be palm computers, personal digital assistants, portable computers, screen phones, mobile phones, desktop computers, etc. As a receiving device, the computing device has at least output capabilities and communication capabilities. For example, there may be palm computers, personal digital assistants, pagers, mobile phones, portable computers, screen phones, desktop computers, etc.

While the above preferred embodiment of the invention has been described in details in conjunction with the accompanied drawings, those skilled in the art recognize that various modifications and changes can be made without departing from the scope and spirit of the invention. Hence the scope of the invention is only defined by the claims.

What is claimed is:

1. A user-oriented database query method for an agent computer comprising the steps of:
   establishing a connection with a querying device, in response to a connection request identifying a user and a querying device;
   receiving a user-generated query request and appended parameters from the identified querying device;
   converting the user-generated query request into a database query command according to the querying device type and the queried database type;
   determining a query time, comprising a suspense period after the expiration of which the query can be executed, based on the appended parameters, network system status, and predetermined information;
   submitting the database query command after the expiration of the query time;
   receiving the query results;
   determining a receiving device according to the appended parameters, the predetermined information and the query results;
   converting the query results into converted query results in a form acceptable by said receiving device;
   sending the converted query results to said receiving device; and
   terminating the query after the acknowledgment of success of sending.

2. The method according to claim 1, wherein said determining a receiving device comprises identifying a receiving device other that said querying device.

3. The method according to claim 2, wherein said querying device has at least input capabilities and communication capabilities.

4. The method according to claim 3, wherein said querying device is selected from the group consisting of palm computer, personal digital assistant, portable computer, screen phone, mobile phone and PC.

5. The method according to claim 2, wherein said receiving device has at least output capabilities and communication capabilities.

6. The method according to claim 5, wherein said receiving device is selected from the group consisting of palm computer, personal digital assistant, portable computer, screen phone, pager, mobile phone and PC.

7. The method according to claim 1, wherein said appended parameters comprise at least one of information regarding query attributes, query priority information, and the identity of a designated receiving device.

8. The method according to claim 7, wherein said query attribute denote at least one of a one-time query, a periodic query and a timed query.

9. The method according to claim 8, wherein said query is a periodic query and wherein said steps of determining a query time, submitting the database query command, determining a receiving device, converting the query results and sending the converted query results are conducted periodically.

10. The method according to claim 8, wherein said query is a timed query and wherein said steps of determining a query time, submitting the database query command, determining a receiving device, converting the query results and sending the converted query results are conducted within a designated valid period of time.

11. The method according to claim 1, wherein said predetermined information comprises at least one of the information submitted by the user during registration and the information submitted or updated after the user registration.

12. The method according to claim 11, wherein said predetermined information comprises at least the user priorities, available querying devices, receiving devices, and user-specific communication fees and transmission time.

13. The method according to claim 1, further comprising said agent computer storing said querying device type, appended parameters, database query command, query time, query results, and acknowledgment of success.

14. The method according to claim 1, wherein said submitting the database query command further comprises the steps of:
   if said query results indicate the failure of the query, repeatedly executing the following steps until the query results indicate the success of the query:
      determining a query time according to the cause of query failure, the appended parameters, the network status and the predetermined information; and
      submitting a database query command after the expiration of the query time and receiving the query results.

15. The method according to claim 1, wherein said sending the converted query results further comprises the steps of:
   if said converted query results cannot be received successfully, repeatedly executing the following steps until the query results are received successfully:
      determining another receiving device according to the appended parameters, the predetermined information and the query results;
      converting the query results into again converted query results in a form acceptable by said another receiving device; and
      sending the again converted query results to said another receiving device, and terminating the query after the acknowledgment of the success of sending.

16. The method according to claim 1, wherein said determining a receiving device comprises selecting a suitable receiving device according to the information quantity and characteristics of the query results.

17. The method according to claim 16, wherein said characteristics of said query results indicate whether said query results are numeral, text, graphic, image, audio, or video data.

18. A user-oriented database query system comprising:
   user management means for managing a plurality of users registered in said database query system and predetermined information about each of said users;
   device management means for managing a plurality of querying devices and a plurality of receiving devices supported by said database query system;
   control means for identifying a user with said user management means, for receiving a user-generated database query request and the appended parameters sent by said user using a querying device, for converting said database query request into a database query command based on the querying device type and the queried database type, and for determining a query time, comprising a suspense period after the expiration of which the query can be executed, based on the appended parameters, the network system status and the predetermined information;
   query agent means for submitting the database query command after the expiration of the query time and for receiving the query results; and query recording means for storing the database query request and the appended parameters received by said control means, the database query command converted by said control means and the determined query time, and for storing the query results received by said query agent means;

wherein said control means further determines a receiving device based on the appended parameters, the predetermined information and the query results, converts the query results into converted query results in a form acceptable by said receiving device, then sends the converted query results to said receiving device and terminates the query after acknowledgment of success of sending.

19. The system according to claim 18, wherein, said control means is adapted to, in the case when the query results received by said query agent device indicate the failure of the query, repeatedly determine a query time according to the cause of query failure, the appended parameters, the network system status and the predetermined information; and said query agent means is adapted to submit at least one database query command after the expiration of the query time and to receive the query results until the indication of success of the query by the query results.

20. The system according to claim 18, wherein said control means is adapted to, in the case when said query results cannot be received successfully, repeatedly determine another receiving device according to the appended parameters, the predetermined information and the query results, to convert the query results into converted query results in a form acceptable by said another receiving device, and to send the converted query results to said another receiving device until the query results are received successfully.

21. The system according to claim 18, wherein said predetermined information comprises at least one of information submitted by the user during registration and information submitted or updated after the user registration.

22. The system according to claim 18, wherein said predetermined information reflects at least the user priorities, available querying devices, receiving devices, and user-specific communication fees and transmission time.

23. The system according to claim 18, wherein said receiving device may be different from said querying device.

24. The system according to claim 23, wherein said querying device has at least input capabilities and communication capabilities.

25. The system according to claim 24, wherein said querying device is any one of palm computer, personal digital assistant, portable computer, screen phone, mobile phone and PC.

26. The system according to claim 23, wherein said receiving device has at least of output capabilities and communication capabilities.

27. The system according to claim 26, wherein said receiving device is selected from the group consisting of palm computer, personal digital assistant, portable computer, screen phone, pager, mobile phone and PC.

28. The system according to claim 18, wherein said appended parameters include information of query attributes, query priority information, and the identity of at least one designated receiving device.

29. The system according to claim 28, wherein said query attributes denote at least an one-time query, a periodic query, or a timed query.

30. The system according to claim 29, wherein said query agent means is adapted to submit database query command, receive the query results, and send the converted query results to the receiving device periodically.

31. The system according to claim 29, wherein said query agent means is adapted to automatically submit database query command, receive the query results, and send the converted query results to the receiving device in a designated valid period of time.

32. The system according to claim 18, wherein said control means comprises a component for selecting a suitable receiving device according to the information quantity and characteristics of the query results.

33. The system according to claim 32, wherein said component for selecting utilizes the characteristics of said query results denoting that said query results are numerals, texts, graphics, images, audio or video data.

34. The system according to claim 18, wherein said database comprises a plurality of different types of databases.

35. A program storage device readable by machine tangibly embodying a program of instructions executable by the machine for performing a user-oriented database query method, said method comprising the steps of:

establishing a connection with a querying device, in response to a connection request identifying a user and a querying device;

receiving a user-generated query request and appended parameters from the identified querying device;

converting the user-generated query request into a database query command according to the querying device type and the queried database type;

determining a query time, comprising a suspense period after the expiration of which the query can be executed, based on the appended parameters, network system status, and predetermined information;

submitting the database query command after the expiration of the query time;

receiving the query results;

determining a receiving device according to the appended parameters, the predetermined information and the query results;

converting the query results into converted query results in a form acceptable by said receiving device;

sending the converted query results to said receiving device; and terminating the query after the acknowledgment of success of sending.

* * * * *